United States Patent
Norrlöw et al.

(10) Patent No.: US 6,793,904 B2
(45) Date of Patent: Sep. 21, 2004

(54) METHOD FOR THE PREPARATION OF SODIUM PERCARBONATE GRANULES HAVING ENHANCED STABILITY

(75) Inventors: Olof Norrlöw, Helsingborg (SE); Pentti Pekonen, Vejbystrand (SE)

(73) Assignee: Kemira Oyj, Helsinki (JP)

( * ) Notice: Subject to any disclaimer, the term of this patent is extended or adjusted under 35 U.S.C. 154(b) by 59 days.

(21) Appl. No.: 10/056,006

(22) Filed: Jan. 28, 2002

(65) Prior Publication Data

US 2002/0141930 A1 Oct. 3, 2002

(30) Foreign Application Priority Data

Jan. 26, 2001 (FI) .............................................. 20010164

(51) Int. Cl.$^7$ .............................................. C01B 15/10
(52) U.S. Cl. .................... 423/415.2; 423/274
(58) Field of Search .............................. 423/415.2, 274; 252/186.2, 186.25, 186.29

(56) References Cited

U.S. PATENT DOCUMENTS

| | | |
|---|---|---|
| 5,935,708 A | 8/1999 | Schuette et al. |
| 6,113,805 A | 9/2000 | Schutte et al. |

FOREIGN PATENT DOCUMENTS

| | | |
|---|---|---|
| EP | 0 623 553 | 11/1994 |
| EP | 0 681 557 | 11/1995 |
| EP | 0 967 175 | 12/1999 |
| JP | 10-194710 | * 7/1998 |
| WO | 95/15291 | 6/1995 |
| WO | WO 95/15291 | * 6/1995 |

* cited by examiner

Primary Examiner—Stuart L. Hendrickson
Assistant Examiner—Peter J Lish
(74) Attorney, Agent, or Firm—Young & Thompson

(57) ABSTRACT

A method for the preparation of sodium percarbonate granules having enhanced stability, comprising modifying the surface of the sodium percarbonate granules by a surface reaction between sodium percarbonate and carbon dioxide or bicarbonate species to form a dense solid film of essentially sodium bicarbonate on the surface of the sodium percarbonate granules, the method comprising the steps of:

Figure 1:
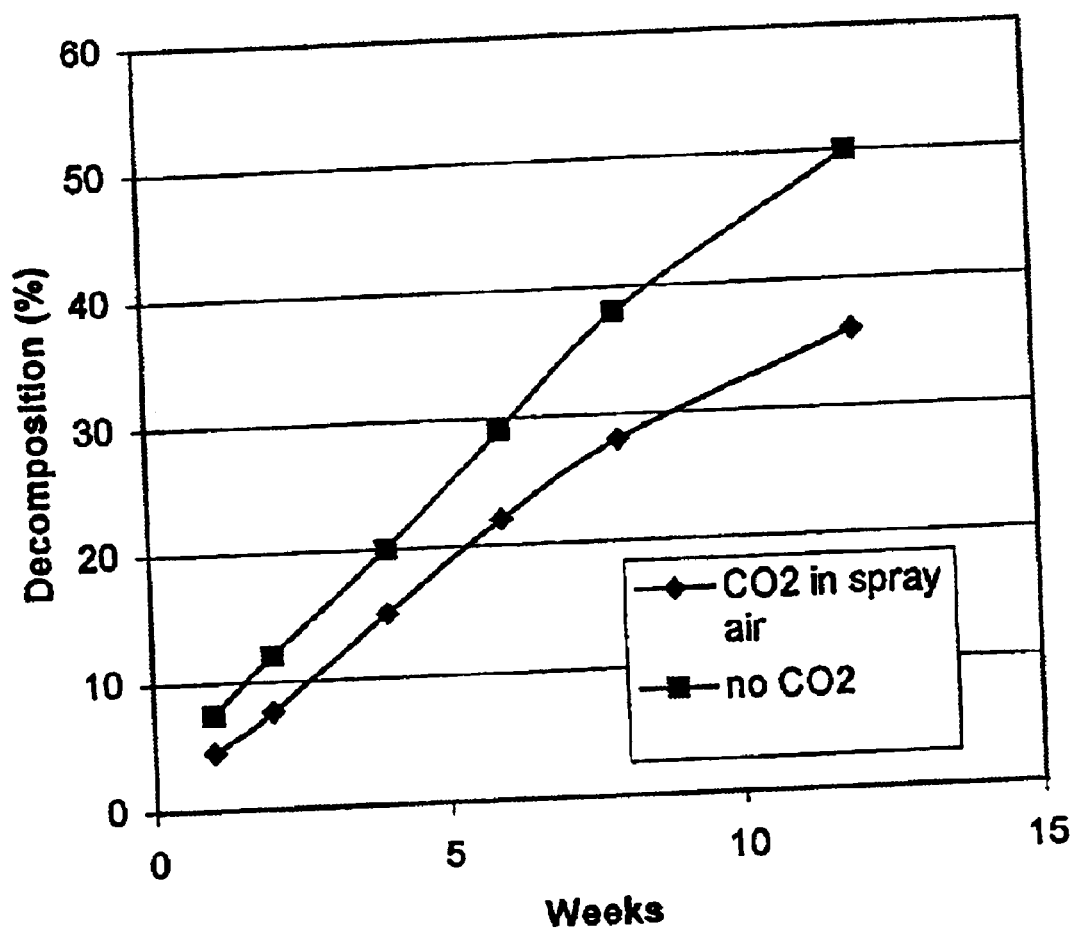

a) dissolving carbon dioxide in water to form an aqueous solution containing dissolved carbon dioxide and bicarbonate, b) exposing the surface of the sodium percarbonate granules to a spray of the aqueous solution containing dissolved carbon dioxide and bicarbonate, to form the solid film of essentially sodium bicarbonate, and subsequently c) removing the residual fluid from the surface.

10 Claims, 2 Drawing Sheets

METHOD FOR THE PREPARATION OF SODIUM PERCARBONATE GRANULES HAVING ENHANCED STABILITY

This invention relates to a method for the preparation of sodium percarbonate granules wherein the granule surface is modified by creating a dense thin film enhancing the stability of the final sodium percarbonate product. Further, the invention relates to these stability enhanced sodium percarbonate granules, and to the use of these granules in detergent compositions.

Sodium percarbonate (SPC) is a water-soluble crystalline peroxygen compound with the molecular formula $2Na_2CO_3.3H_2O_2$. Its theoretical active oxygen content (AO) is 15.28% by weight. Sodium percarbonate as such is a stable compound but it tends to decompose when included in detergent formulations, especially during storage, loosing its active oxygen content. The stability of a percarbonate compound in a detergent formulation is essential for the success of replacing perborate compounds as peroxide bleaching sources.

Especially, entering a more severe climate requiring storage under very warm and/or humid conditions sodium percarbonate will decompose even alone. An other problem is the use of sodium percarbonate in zeolite-containing detergents where it looses its bleaching effect after a relatively short storing period.

The decomposition of sodium percarbonate can be prevented or delayed by coating the SPC granules. The use of thick sodium bicarbonate and other inorganic coating layers has been previously disclosed. It is also possible to use organic materials and polymers, and combinations of these different materials. It is also known to obtain more stable sodium percarbonate by screening a commercial product in a specific manner for a certain particle size and form.

From thin film technology, it is known that even very thin films in order of 5–50 nm can be chemically very resistant depending on the material and the used technology. For example, etch barriers for wet lithographic processes can be formed in which the thin layers are of better quality, much denser and chemically more resistant, than the corresponding bulk material. A typical issue is to obtain rather a thin conformal coating than a thick mechanically protective layer. This is especially true when rough surfaces or sharp steps are to be covered and protected. This type of conformal coating is preferably pinhole free thus showing good chemical resistance towards e.g. aqueous solutions.

A similar assumption was applied to the preparation of a thin coating film onto the surface of a spherical and in a microscopic scale rough SPC granule. The morphological studies have shown that the surface roughness of an SPC granule produced in a special fluidized bed reactor is not very high only about one micro-meter which is less than the roughness obtained by several other preparation methods. This enhances the possibility to influence and modify the surface micro-structure in a more uniform manner.

In our previous patent EP 681 557 the surface of sodium percarbonate granules was first sprayed with water in order to dissolve a minor fraction of the sodium percarbonate granule surface. Subsequently, the dissolved aqueous sodium percarbonate surface layer formed was neutralised into a thin layer of sodium bicarbonate by carbon dioxide gas. In this method the carbon dioxide gas was introduced onto the surface as part of the fluidizing gas used in a fluidized bed reactor. As the water film dries in the presence of carbon dioxide gas a thin sodium bicarbonate layer remains on the granule surface. The granules thus prepared could be coated with other coating materials to form a thick additional coating layer. These sodium percarbonate granules were used in zeolite-containing detergents and in humid air conditions these granules exhibited better stability characteristics than granules prepared without the deposition of the thin bicarbonate layer. The measured results showed indirectly the influence of the SPC surface modification.

Presently, the stability of percarbonate is at an adequate level but entering even more severe climate than usual, storage under warm and humid conditions together with a zeolite-containing detergent a further improved product is needed. Thus, the method described in our previous patent EP 681 557 was developed further.

The object of the invention is to improve the formation conditions of the thin protective bicarbonate film and this is accomplished by using carbon dioxide gas dissolved in water prior to application onto the sodium percarbonate granules. By treating the surface using carbon dioxide gas dissolved in water a better quality thin film is achieved judged indirectly by the stability experiments made using this method compared to otherwise prepared products.

Hence this invention provides a way to further enhance the stability of sodium percarbonate granules by optimising the formation conditions of the thin sodium bicarbonate film onto the surface of the sodium percarbonate granules.

Thus, in one aspect of the invention there is provided a method for the preparation of sodium percarbonate granules having enhanced stability, comprising modifying the surface of the sodium percarbonate granules by means of a surface reaction between sodium percarbonate and carbon dioxide or bicarbonate species to form a dense solid film of essentially sodium bicarbonate on the surface of the sodium percarbonate granules, said method comprising the steps of:
a) dissolving carbon dioxide in water to form an aqueous solution containing dissolved carbon dioxide and bicarbonate,
b) exposing the surface of the sodium percarbonate granules to a spray of said aqueous solution containing dissolved carbon dioxide and bicarbonate, to form said solid film of essentially sodium bicarbonate, and subsequently
c) removing the residual fluid from the surface.

Preferred embodiments of the method of the invention are described in claims 2 to 10.

In a second aspect of the present invention there is provided sodium percarbonate granules prepared by the method of the invention.

According to present invention $CO_2$ can be dissolved into water a spray by using a conventional two-way nozzle. Preferably, driving air of the spray nozzle containing from 0.2 to 5% by weight $CO_2$ is sprayed through one nozzle and this gas mixture is dissolved into water which is sprayed through the other nozzle. A spray of water saturated with $CO_2$ is directed towards the SPC granules and these granules reside in the fluidized bed preferably for 0.5 to 15 min. For example, air can be used as the fluidizing gas stream. The temperature in the fluid bed is maintained between 30° C. and 90° C. by electrically controlled heating elements. The granule surface is modified by the thin bicarbonate film formed by the reaction of moisture and $CO_2$ or $HCO_3$ with SPC. After this the thin surface film is dried.

Further, according to the present invention $CO_2$ can be dissolved into water in a separate premixing tank before guiding the solution into the fluid bed and exposing the SPC granules residing in the bed to the spray. This type of premixing allows the dissolution more time and the ambient conditions can be more easily regulated.

Additionally, according to the present invention $CO_2$ can be dissolved into water inside the guiding line ending at the fluid bed by static mixing. Water and $CO_2$ gas are injected into the guiding line before the fluid enters the fluid bed. This type of solution is mechanically the easiest to realize.

An additional coating layer can be deposited on top of this modified surface or intermediate film. The additional coating layer is formed by spraying an aqueous solution from a spray nozzle onto the granules having the intermediate film already on, preferably in the fluidized bed. After the additional coating the product is ready to be used for example as a detergent component.

In one embodiment of the invention the surface modification by $CO_2$ is performed several times meaning that the above steps a) to c) are repeated from 1 to 10 times, in order to enhance the influence of the surface modification by making the thin bicarbonate film thicker. The thickness of the formed thin film depends on the number of coating sequences used. Accurate thickness measurements from the used SPC surfaces are very difficult to perform but the film thickness is estimated to be less than 100 nm.

In another embodiment of the invention the water saturated with carbon dioxide can be prepared by dissolving carbon dioxide in water at an elevated pressure to enhance the gas content and to speed up the dissolution.

The content of $CO_2$, calculated as percent by weight of the sprayed substances, in the water to be sprayed on the surfaces of the SPC granules is preferably at least 0.25%, more preferably at least 0.5%.

The fluidizing gas used can be for example air, $N_2$ or any other inert gas, preferably air.

The solution for spraying the additional coating layer can comprise various materials commonly used for coating e.g. sodium bicarbonate, soda (including the various forms of sodium carbonate), sodium sulphate, a mixture of lithium sulphate and sodium sulphate, a mixture of soda and sodium sulphate or a polymer with or without a metal sulphate.

Preferably, the additional coating layer comprises from 1 to 20% by weight, and more preferably from 5 to 12% by weight of the sodium percarbonate granule.

The present invention decreases considerably the $CO_2$ consumption of the process compared to the method described in our previous patent EP 681 557. The $CO_2$ purge is now concentrated on the location where it directly can be dissolved into the used water and in a more efficient form carried into contact with the SPC granule surface. This design reduces the amount of $CO_2$ by more than 90%. In addition, the SPC granule surface confronts an enhanced amount of dissolved $CO_2$ or the concentration of $H_2CO_3$ or $HCO_3^-$ in the water is locally higher.

In addition, the temperature and pH of the aqueous solution to be applied to the granules is easier to adjust making the process more robust.

The stability of the product when prepared by the above described method of the present invention is enhanced by about 10%. The mechanism behind the phenomenon is not quite clear. It is possible that due to the formed thin film of sodium bicarbonate the adherence and thus the quality of the additional coating layer is enhanced.

Figure 2:
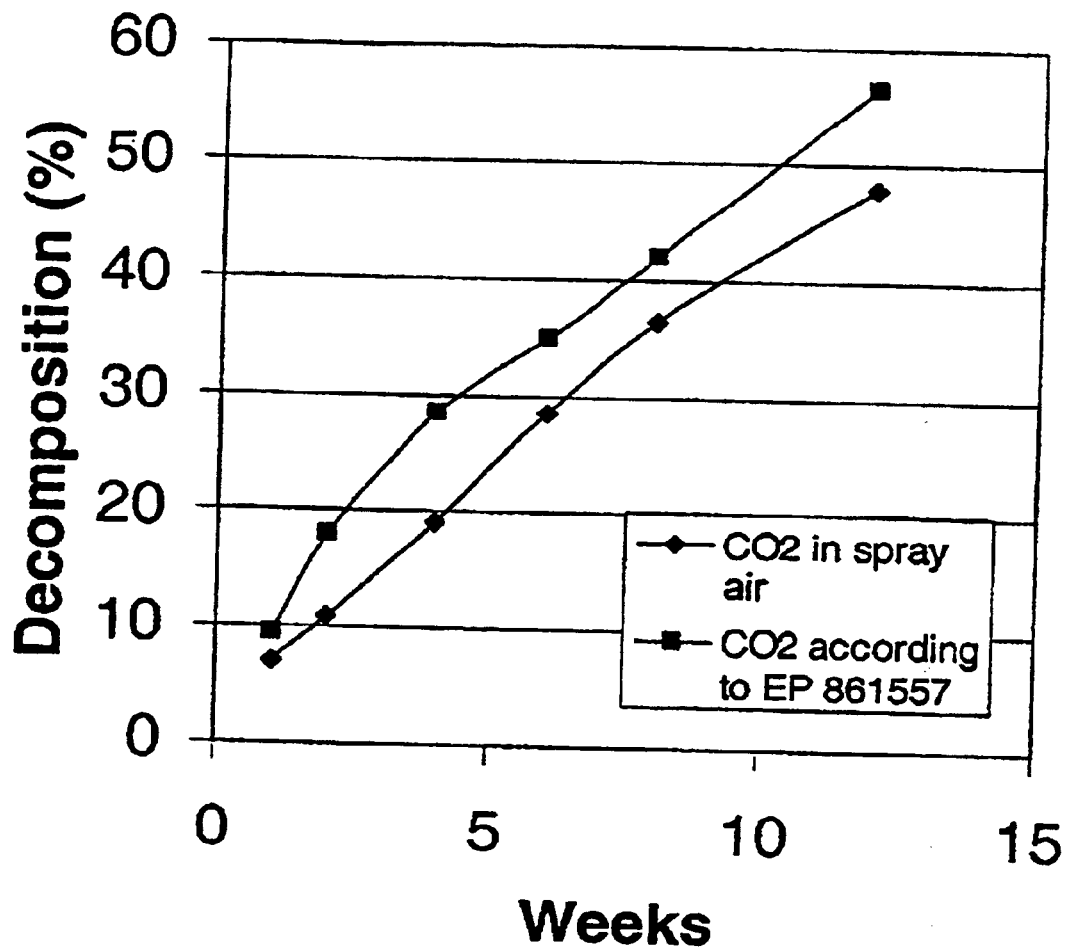

The invention is described in more detail by following examples. The enclosed FIGS. 1 and 2 show graphically the stability results from comparative tests.

EXAMPLE 1

SPC granules were prepared using a fluid bed spray granulator as described in Kemira Kemi's production brochure "ECOX Sodium percarbonate" from September 1998. These uncoated SPC granules with a mean granule diameter of 0.7 mm were circulated back into the processing chamber of the granulator. The fluidization gas was air with a velocity of 120 m³/h. A two-way nozzle was used in Glatt AGT 150 fluid bed apparatus for coating the SPC granules. The bed temperature was essentially 60° C.

The $CO_2$-enriched fluid spray was prepared by spraying $CO_2$-enriched air from one nozzle used as driving gas with a gas pressure of 0.15 MPa (1.5 bar) and gas flow of 5.6 m³/h. This flow was dissolved in water which was sprayed from the second nozzle at the rate of 40 g/min.

By exposing the SPC granules to the $CO_2$ enriched fluid spray for 2 min, the granules were coated by a thin bicarbonate surface film.

EXAMPLE 2

The amount of carbon dioxide in the driving gas to be dissolved in water was varied. The contents of 0%, 0.25%, 0.5% and 1% were used and the coating was carried out as described in example 1.

Subsequently, the bicarbonate-coated granules were sprayed with a sodium sulphate solution to form a sodium sulphate coating in an amount of 10% by weight of the SPC granules. This additional coating layer was sprayed using the same nozzle as for coating with $CO_2$, after the $CO_2$ coating. Air was used as driving gas.

The SPC granules thus treated were mixed with zeolite in a weight ratio of 50/50 for testing the stability in the presence of detergent conditions.

The samples were positioned in open boxes into a humidity chamber at a temperature of 30° C. and 70% relative humidity for 12 weeks. The active oxygen values were measured before and after the test and the amount of decomposition was calculated from the peroxide content determined by titration before and after storage. The test results are compiled in Table 1.

TABLE 1

| Amount of $CO_2$ (%) | Decomposition in (%) |
| --- | --- |
| 0 | 70 |
| 0.25 | 65 |
| 0.5 | 53 |
| 1.0 | 48 |

The above results show a clear decrease in the decomposition as the carbon dioxide content in the spraying fluid was increased.

EXAMPLE 3

SPC granules were prepared according to example 1 by using 0% and 0.5% of $CO_2$ in the driving gas. These granules were coated further and mixed into a detergent base according to example 2. Both detergent mixtures were filled into detergent cartridges and closed hermetically. These two cartridges were placed into a climate chamber for 8 weeks at 40° C. and 70% RH.

The reference sample with 0% of $CO_2$ coating showed 41% of decomposition and in the sample coated with 0.5% $CO_2$ in the driving gas the decomposition was halved, 22%.

EXAMPLE 4

SPC granules were coated as described in examples 1 and 2 using 1% $CO_2$ in the driving air of the nozzle and two minutes of spraying with the $CO_2$-containing water.

Subsequently, the bicarbonate-coated granules were sprayed with a sodium sulphate solution to form a sodium sulphate coating in an amount of 12% by weight of the SPC granules.

In a control test uncoated SPC granules were sprayed with a sodium sulphate solution to form a sodium sulphate coating in an amount of 12% by weight of the SPC granules.

The SPC granules had a size distribution between 0.50–0.71 mm. The decomposition of the granules was tested at 30° C. temperature and 70% relative humidity for 12 weeks as described in example 2.

The decomposition curves are shown in FIG. 1. The results show that the thin bicarbonate film formed on the surfaces of the SPC granules decreased decomposition by 25%.

EXAMPLE 5

SPC granules were coated using $CO_2$ by the method described in EP 681 557 and according to examples 1 and 2 above using 1.0% $CO_2$ in the driving air of the nozzle and 2 minutes of spraying with the $CO_2$-containing water.

Subsequently, the bicarbonate-coated granules were sprayed with a sodium sulphate solution to form a sodium sulphate coating in an amount of 9% by weight of the SPC granules.

The decomposition of the coated granules was tested at 30° C. temperature and 70% relative humidity for 12 weeks as described in example 2.

The decomposition curves are shown in FIG. 2. The results show that the decomposition percentage decreases further by 8 units in the SPC granules prepared according to the method of the present invention.

EXAMPLE 6

The coating of the SPC granules were realized by introducing carbon dioxide gas into a pH adjusted water solution in a separate mixing tank, before guiding this solution into the sprayer. The pH values of the tank solutions were adjusted by addition of appropriate amounts of NaOH. Experiments were carried out with initial pH values of the water solutions being 8, 9 and 11. The diameter of the SPC granules used in these experiments was 0.7 mm. Water solutions were purged with 60 l/h $CO_2$ gas flow for 7 min, 5 min and 6 min, respectively, before introduction onto the SPC granules in the fluid bed.

After coating the granules with $CO_2$ containing water solution, the granules were additionally coated with sodium sulfate (NAS) from Säiteri Factories. Table 2 shows the influence of the premixing in tank and adjustment of the solution pH in terms of NAS and $H_2O_2$ percentage of the stabilized product and its decomposition rate.

TABLE 2

| Initial pH | NAS (%) | $H_2O_2$ (%) | Decomposition rate (%) |
|---|---|---|---|
| 8 | 10.7 | 28.1 | 35.5 |
| 9 | 10.2 | 28.3 | 32.3 |
| 11 | 10.7 | 28.2 | 29.6 |

What is claimed is:

1. A method for the preparation of sodium percarbonate granules having enhanced stability, comprising modifying the surface of the sodium percarbonate granules by means of a surface reaction between sodium percarbonate and carbon dioxide or bicarbonate species to form a dense solid film of essentially sodium bicarbonate on the surface of the sodium percarbonate granules, characterized in that a) carbon dioxide is dissolved in water to form an aqueous solution containing dissolved carbon dioxide and bicarbonate, b) the surface of the sodium percarbonate granules is exposed to a spray of said aqueous solution containing dissolved carbon dioxide and bicarbonate, to form said solid film of essentially sodium bicarbonate, and subsequently c) the residual fluid is removed from the surface.

2. A method according to claim 1, characterized in that the carbon dioxide is dissolved in water in a two-way nozzle to form the spray of said aqueous solution containing dissolved carbon dioxide.

3. A method according to claim 1, characterized in that the carbon dioxide is dissolved in water in a premixing tank.

4. A method according to claim 1, characterized in that the carbon dioxide is dissolved in water inside a guiding line tube wherein the carbon dioxide gas and water are injected.

5. A method according to claim 1, characterized in that the content of carbon dioxide in the aqueous solution to be sprayed is at least 0.25% by weight.

6. A method according to claim 1, characterized in that the surface of the sodium percarbonate granules is exposed to said spray for a period of from 0.5 to 15 minutes.

7. A method according to claim 1, characterized in that the thickness of said film is less than 100 nm.

8. A method according to claim 1, characterized in that the method additionally comprises repeating steps a) to c) from one to ten times to increase the thickness of the film by creating multiple layers.

9. A method according to claim 1, characterized in that the method is carried out in a fluidized bed reactor comprising a step of spraying said aqueous solution containing dissolved carbon dioxide inside the fluidized bed from a spray nozzle inside the fluidized bed reactor.

10. A method according to claim 1, characterized in that the method additionally comprises depositing an additional coating layer on top of said film of sodium bicarbonate, said additional coating layer comprising sodium sulphate, soda, sodium bicarbonate, a mixture of sodium sulphate and lithium sulphate, a mixture of soda and sodium sulphate, a mixture of a metal sulphate and a polymer or a polymer.

* * * * *